(12) United States Patent
Windbergs

(10) Patent No.: US 10,273,914 B2
(45) Date of Patent: Apr. 30, 2019

(54) INJECTION DEVICE, INTERNAL COMBUSTION ENGINE, AND METHOD FOR OPERATING AN INTERNAL COMBUSTION ENGINE

(75) Inventor: Thor Windbergs, Ludwigsburg (DE)

(73) Assignee: ROBERT BOSCH GMBH, Stuttgart (DE)

(*) Notice: Subject to any disclaimer, the term of this patent is extended or adjusted under 35 U.S.C. 154(b) by 1111 days.

(21) Appl. No.: 14/236,521

(22) PCT Filed: Jun. 6, 2012

(86) PCT No.: PCT/EP2012/060747
§ 371 (c)(1),
(2), (4) Date: May 14, 2014

(87) PCT Pub. No.: WO2013/017321
PCT Pub. Date: Feb. 7, 2013

(65) Prior Publication Data
US 2014/0261326 A1    Sep. 18, 2014

(30) Foreign Application Priority Data

Aug. 3, 2011  (DE) .................... 10 2011 080 346

(51) Int. Cl.
*F02M 67/14* (2006.01)
*F02M 31/02* (2019.01)
(Continued)

(52) U.S. Cl.
CPC ......... *F02M 31/02* (2013.01); *F02D 19/0692* (2013.01); *F02D 19/081* (2013.01);
(Continued)

(58) Field of Classification Search
CPC ...... F02M 67/14; F02M 43/04; F02M 55/002; F02M 35/10177; F02M 37/0064;
(Continued)

(56) References Cited

U.S. PATENT DOCUMENTS 5,465,701 A    11/1995  Hunt
7,894,973 B2   2/2011   Mallebrain et al.
(Continued)

FOREIGN PATENT DOCUMENTS

CN    101375049 A    2/2009
DE    2158117        5/1973
(Continued)

OTHER PUBLICATIONS

International Search Report for PCT/EP2012/060747, dated Sep. 21, 2012.

*Primary Examiner* — Lindsay M Low
*Assistant Examiner* — Omar Morales
(74) *Attorney, Agent, or Firm* — Norton Rose Fulbright US LLP; Gerard Messina

(57) ABSTRACT

An injection device for an internal combustion engine is described, which has a first fuel injector for injecting fuel having a first fuel composition based on ethanol, and a separate second fuel injector for injecting fuel having a second fuel composition, which differs from the first fuel composition, the injection device having a heating device for preheating exclusively the fuel having the first fuel composition and injected by way of the first fuel injector.

13 Claims, 1 Drawing Sheet

(51) Int. Cl.
   *F02M 35/10*  (2006.01)
   *F02M 43/04*  (2006.01)
   *F02M 53/06*  (2006.01)
   *F02M 31/125* (2006.01)
   *F02D 19/06*  (2006.01)
   *F02D 19/08*  (2006.01)
   *F02M 69/04*  (2006.01)
   *F02D 41/06*  (2006.01)
   *F02D 41/00*  (2006.01)

(52) U.S. Cl.
   CPC .... *F02M 31/125* (2013.01); *F02M 35/10216* (2013.01); *F02M 43/04* (2013.01); *F02M 53/06* (2013.01); *F02M 69/044* (2013.01); *F02D 19/0647* (2013.01); *F02D 19/084* (2013.01); *F02D 41/0025* (2013.01); *F02D 41/064* (2013.01); *Y02T 10/126* (2013.01); *Y02T 10/36* (2013.01)

(58) Field of Classification Search
   CPC .... F02M 13/06; F02M 15/025; F02M 15/045; F02M 43/00; F02M 53/02; F02M 31/125; F02M 69/044; F02M 69/045; F02M 31/02; F02M 35/10216; F02M 53/06; F02D 19/0694; Y02T 10/36

USPC ................. 123/445, 446, 299, 300
   See application file for complete search history.

(56) References Cited

U.S. PATENT DOCUMENTS 8,027,777 B2    9/2011  Ichihara et al.
   2008/0060621 A1* 3/2008 Trapasso ............. F02M 31/125
                                                      123/557
   2009/0114193 A1* 5/2009 Cooke .................. F02M 43/00
                                                      123/457
   2009/0248275 A1* 10/2009 Ichihara ................. F02D 29/02
                                                      701/103
   2009/0281709 A1  11/2009 Mallebrain et al.

FOREIGN PATENT DOCUMENTS

DE   102004040715 A1 * 3/2006 ............. F02M 31/02
   DE   102008016376       1/2009
   DE   102009000894       10/2009
   DE   102008001606       11/2009
   EP        1382826        1/2004
   GB        1380324        1/1975
   WO      00/61927 A1      1/2000
   WO       WO00/61927      10/2000

* cited by examiner

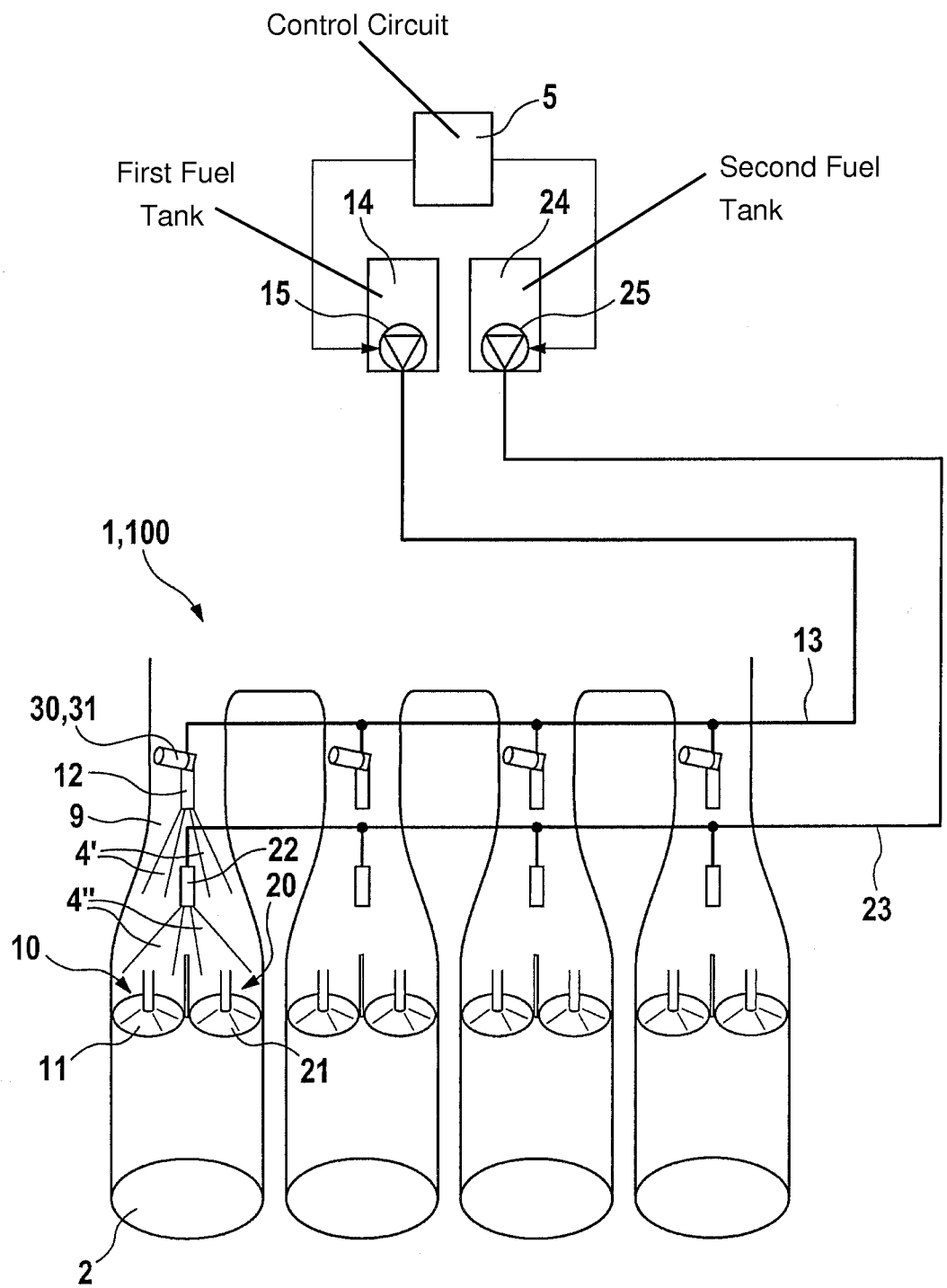

INJECTION DEVICE, INTERNAL COMBUSTION ENGINE, AND METHOD FOR OPERATING AN INTERNAL COMBUSTION ENGINE

FIELD OF THE INVENTION

The present invention is based on an injection device.

BACKGROUND INFORMATION

German Published Patent Appln. No. 2 158 117 describes an internal combustion engine having throttle control, in which an injection device injects fuel into the intake manifold leading into a combustion chamber of the internal combustion chamber; the fuel is heated by an electrical fuel heater prior to the injection, in order to improve the evaporation of the fuel following the injection. In this particular case, an Otto engine having intake manifold injection is involved, which is operated using a gasoline-based fuel.

In addition, from German Published Patent Appln. No. 10 2009 000 894, for example, it is known to operate internal combustion engines not only using gasoline-based fuels, but to supply them also with alternative fuels such as (bio) ethanol, compressed gas (CNG, Compressed Natural Gas) or liquid gas (LNG, Liquefied Natural Gas), either additionally or exclusively. However, considerable cold start problems arise when using fuels of this type. Especially when using a fuel made up to 100% of bio-ethanol, considerable startup difficulties occur already at a temperature limit of approximately 15° C., depending on the individual engine characteristics, so that high exhaust-gas rates are produced in the cold start phase in addition.

SUMMARY

In contrast to the related art, the injection device according to the present invention, the internal combustion engine according to the invention, and the method for operating an injection device according to the invention have the advantage of allowing the internal combustion engine to be operated using fuel based on ethanol as well as an additional fuel, even at low temperatures. In particular the cold-start capability is improved when using the fuel based on ethanol, so that both fuel compositions are able to be utilized pari passu in parallel, and regardless of the outside temperature. The first fuel composition preferably includes (bio)ethanol or a gasoline-ethanol mixture. Prior to the injection, the first fuel composition is preheated by the heating device and then injected, either subsequently or simultaneously, by way of the first fuel injector, so that the internal combustion engine is able to be started using the fuel based on ethanol exclusively, even at low temperatures. Moreover, additionally or exclusively, the internal combustion engine is able to be operated using fuel of the second fuel composition, the second fuel composition preferably including a conventional fuel such as gasoline or diesel. However, as an alternative, the use of compressed natural gas (CNG, Compressed Natural Gas) or liquefied gas (LNG, Liquefied Natural Gas) as second fuel composition is basically conceivable as well. The injection device according to the present invention advantageously allows an extremely flexible operation of the internal combustion engine, because more than one fuel and injection system is combined with each other (also referred to as bi-fuel or flex-fuel system). The internal combustion engine preferably includes an Otto engine having gasoline-direct injection or gasoline-manifold injection, or a diesel engine having diesel-direct or diesel-manifold injection, which additionally features the manifold or direct injection of the second fuel composition based on ethanol. Such a combination is conceivable especially in commercial vehicles. The heating device preferably includes an electrical heater in the form of an electrical resistance wire.

According to one preferred specific embodiment, the second fuel injector has an injection nozzle for injecting fuel of a second fuel composition based on diesel fuel. In an advantageous manner, the internal combustion engine thus is optionally able to be operated using ethanol or diesel. As a result, the use of ethanol-based fuels especially in the commercial vehicle sector is possible. Moreover, reduced exhaust-gas emissions are achievable.

According to one preferred specific embodiment, the second fuel injector is designed to inject at a higher injection pressure than the first fuel injector. Thus, an injection of diesel under high pressure is advantageously possible, while the fuel based on ethanol is simultaneously injectable at an optimizable lower pressure. As an alternative, however, it would also be conceivable that the first and the second fuel injector operate at virtually identical injection pressures. The injection of fuel having the first and/or second fuel composition preferably takes place at a pressure between 3.8 and 5.0 bar, and especially preferably, at essentially 4.2 bar.

According to one preferred specific embodiment, the heating device includes a heating unit which is integrated into the first injection valve, and/or the heating device includes a heating unit which is integrated into a central fuel supply line for the first fuel injector. In this way the design of the injection device preferably is adaptable to the individual conditions with regard to the available space in the vehicle. The heating unit preferably is integrated into the first fuel injector, so that both the preheating and the injection of the fuel is carried out by way of the first fuel injector.

According to one preferred specific embodiment, the first and the second fuel injector are controllable independently of one another, and/or the first fuel injector and the second fuel injector are dimensioned for different fuel flow rates, the first fuel injector preferably being dimensioned for a higher fuel flow rate range than the second fuel injector. As a result, the particular fuel injector is advantageously able to be adapted to the fuel type to be injected. Through different dimensioning and separate control of the fuel injectors, the individual metering range of the fuel injection system furthermore is optimized, so that precise injections are possible. Precise dosing of the injected fuel quantity furthermore results in an improved and fault-free burn-through, which, for example, ensures a reliable cold-start phase and lower emission rates.

According to one preferred specific embodiment, the first fuel injector is installed in such a way that the first fuel injector injects the fuel of the first fuel composition into an intake manifold of the internal combustion engine and/or directly into a combustion chamber of the internal combustion engine, and/or the second fuel injector is installed in such a way that the second fuel injector injects the fuel of the second fuel composition into the intake manifold of the internal combustion engine and/or directly into the combustion chamber of the internal combustion engine. As a result, the combined drive concept is advantageously able to be used both in internal combustion engines having direct injection and in internal combustion engines having manifold injection.

According to one preferred specific embodiment, both the first fuel injector and the second fuel injector are situated in the intake manifold, the second fuel injector being situated along the intake manifold, preferably between the first fuel injector and the combustion chamber. This advantageously achieves an upstream diesel injection, which is combined with optimized spray targeting in an especially preferred manner in order to obtain reduced exhaust-gas emissions in the cold-start phase.

According to one preferred specific embodiment, the first fuel injector is configured to inject the fuel having the first fuel composition both in the direction of a first intake valve situated between the intake manifold and the combustion chamber, and in the direction of a second intake valve situated between the intake manifold and the combustion chamber, and/or the second fuel injector is configured to inject the fuel having the second fuel composition both in the direction of the first intake valve and in the direction of the second intake valve. Because the injection takes place in the direction of the first and the second intake valve in each case, a homogeneous and stable burn-through of the injected fuel is promoted, especially in the startup and warm-up phase, inasmuch as only a reduced through-flow quantity of fuel needs to be injected in the direction of each fuel injector. This produces a lower spray density, i.e., the characteristic droplet size, especially the Sauter diameter, of the atomized fuel is advantageously reduced, and the evaporated fuel component in the intake manifold is increased, which achieves a faster and more stable burn-through of the fuel mixture in the combustion chamber. As an alternative, it is conceivable that the second fuel injector has a first valve for injecting the fuel of the first fuel composition in the direction of the first intake valve, and a second valve for injecting the fuel of the first fuel composition in the direction of the second intake valve.

Another subject matter of the present invention is an internal combustion engine which includes an injection device according to the present invention. The internal combustion engine according to the present invention is advantageously able to be operated using both fuel types pari passu and independently of the outside temperature.

Another subject matter of the present invention is a method for operating an injection device according to the present invention for an internal combustion engine, in which fuel having the second fuel composition optionally is injected into the internal combustion engine using the second fuel injector, and/or fuel having the first fuel composition is preheated by the heating device and injected by the first fuel injector. This enables an operation of the internal combustion engine using different fuels, one of these fuels being based on ethanol, without an adverse effect on the cold-start characteristics.

Exemplary embodiments of the present invention are illustrated in the drawing and explained in greater detail in the following description.

BRIEF DESCRIPTION OF THE DRAWING

FIG. 1 shows a schematic view of an injection device and an internal combustion engine which includes an injection device according to an exemplary specific embodiment of the present invention.

DETAILED DESCRIPTION

In the various FIGURES, identical parts have always been provided with the same reference symbols and therefore are usually labeled or mentioned only once.

FIG. 1 represents a schematic view of an injection device 1 and, at least partially, of an internal combustion engine 100 according to one exemplary embodiment of the present invention. Internal combustion engine 100 illustrated has four cylinders by way of example. Each one of the four cylinders is provided with a combustion chamber 2 in which a piston (not shown) is moving. The wall of each combustion chamber 2 has a first intake orifice 10 and a second intake orifice 20, through which an air-fuel mixture is aspirated into combustion chamber 2 through an intake manifold 9. Each combustion chamber 2 furthermore has outlet ports (not shown), through which the raw exhaust gases of the combusted air-fuel mixture are expelled from combustion chambers 2. Each cylinder furthermore includes a first intake valve 11, which is provided for sealing the individual first intake orifice 10, and a second intake valve 21, which is provided for sealing second intake orifice 20. For each cylinder, injection device 1 includes a first fuel injector 12, disposed in intake manifold 9, for the injection of fuel 4' having a first fuel composition. In the example, the first fuel composition includes (bio)ethanol, which is injected into intake manifold 9 of internal combustion engine 100 in the direction of first intake orifice 10 and second intake orifice 20 in the form of two spray cones. Through first and second intake orifices 10, 20, fuel 4' having the first fuel composition reaches combustion chamber 2, in which an ignitable air-ethanol mixture therefore comes about. To improve the cold-start characteristics, injection device 1 has a heating device 30, which preheats the fuel having the first fuel composition injected by way of first fuel injector 12. Heating device 30 preferably includes an electric heat resistor 31 integrated into first fuel injector 12.

In addition, injection device 1 includes a second fuel injector 22 for the injection of fuel 4" having a second fuel composition, which differs from the first fuel composition. Second fuel injector 22 is situated along a direction running parallel to intake manifold 9, between combustion chamber 2 and first fuel injector 12. In the present example, second fuel injector 12 includes an injection nozzle for injecting diesel fuel into the intake manifold. First fuel injector 12 injects diesel fuel 4" under high pressure, i.e., especially at a higher pressure than fuel 4', based on ethanol, having the first fuel composition. Diesel fuel 4" in the form of two spray cones is injected into intake manifold 9 in the direction of first intake orifice 10 and in the direction of second intake orifice 20, so that an ignitable air-diesel mixture forms inside combustion chamber 2.

Fuel 4' having the first fuel composition is supplied to first fuel injector 12 from a first fuel tank 14 via a first line system 13 by way of a first fuel pump 15. Via a separate second line system 23, which is independent of first line system 13, second fuel injector 22 is supplied with diesel fuel 4" from a second fuel tank 24 by way of a second fuel pump 25. Second fuel pump 25 provides an appropriately high compression of diesel fuel 4".

It is optionally possible to operate internal combustion engine 100 using the ethanol-based fuel 4' or diesel fuel 4" exclusively. However, a mixed operation using both fuels is conceivable as well. A control circuit 5, which is electrically connected to first fuel pump 15, second fuel pump 25, first fuel injector 12 and second fuel injector 22, controls first and second fuel pumps 15, 25 and first and second fuel injectors 12, 22 accordingly.

What is claimed is:
1. An injection device for an internal combustion engine, comprising:

a first fuel injector for an injection of a first fuel having a first fuel composition, the first fuel composition including an ethanol component;

a separate second fuel injector for an injection of a second fuel having a second fuel composition that differs from the first fuel composition; and a heating device for preheating exclusively the first fuel having the first fuel composition, the first fuel being injected by the first fuel injector, wherein the heating device includes a heating unit integrated into a central fuel supply line for the first fuel injector, wherein at least one of:

the first and second fuel injectors are controllable independently of each other, and the first fuel injector and the second fuel injector are dimensioned for different fuel flow rates.

2. The injection device as recited in claim 1, wherein the second fuel injector includes an injection nozzle for injecting the second fuel having the second fuel composition, wherein the second fuel composition is based on diesel fuel.

3. The injection device as recited in claim 1, wherein the second fuel injector is for an injection at a higher injection pressure than the first fuel injector.

4. The injection device as recited in claim 1, wherein the heating unit is integrated into the first fuel injector.

5. The injection device as recited in claim 1, wherein at least one of:

the first fuel injector is placed in such a way that the first fuel having the first fuel composition is injected by the first fuel injector at least one of into an intake manifold of the internal combustion engine and directly into a combustion chamber of the internal combustion engine, and the second fuel injector is placed in such a way that the second fuel having the second fuel composition is injected by the second fuel injector at least one of into the intake manifold of the internal combustion engine and directly into the combustion chamber of the internal combustion engine.

6. The injection device as recited in claim 1, wherein the first fuel injector and the second fuel injector are situated in an intake manifold, the first fuel injector being situated along the intake manifold.

7. The injection device as recited in claim 6, wherein the first fuel injector is situated between the second fuel injector and a combustion chamber.

8. The injection device as recited in claim 1, wherein at least one of:

the first fuel injector is configured for injecting the first fuel having the first fuel composition, both in a direction of a first intake valve situated between an intake manifold and a combustion chamber, and in a direction of a second intake valve situated between the intake manifold and the combustion chamber, and the second fuel injector is configured for injecting the second fuel having the second fuel composition both in the direction of the first intake valve and in the direction of the second intake valve.

9. An injection device for an internal combustion engine, comprising:

a first fuel injector for an injection of a first fuel having a first fuel composition, the first fuel composition including an ethanol component;

a separate second fuel injector for an injection of a second fuel having a second fuel composition that differs from the first fuel composition; and a heating device for preheating exclusively the first fuel having the first fuel composition, the first fuel being injected by the first fuel injector, wherein the heating device includes a heating unit integrated into a central fuel supply line for the first fuel injector, wherein the first fuel injector is dimensioned for a higher fuel flow rate range than the second fuel injector.

10. An internal combustion engine, comprising:

an injection device for an internal combustion engine, comprising:

a first fuel injector for an injection of a first fuel having a first fuel composition, the first fuel composition including an ethanol component;

a separate second fuel injector for an injection of a second fuel having a second fuel composition that differs from the first fuel composition; and a heating device for preheating exclusively the first fuel having the first fuel composition, the first fuel being injected by the first fuel injector, wherein the heating device includes a heating unit integrated into a central fuel supply line for the first fuel injector, wherein at least one of:

the first and second fuel injectors are controllable independently of each other, and the first fuel injector and the second fuel injector are dimensioned for different fuel flow rates.

11. The internal combustion engine as recited in claim 10, wherein the heating unit is integrated into the first fuel injector.

12. A method for operating an injection device for an internal combustion engine, the injection device including a first fuel injector for an injection of a first fuel having a first fuel composition, the first fuel composition including an ethanol component; a separate second fuel injector for an injection of a second fuel having a second fuel composition that differs from the first fuel composition; and a heating device for preheating exclusively the first fuel having the first fuel composition, the first fuel being injected by the first fuel injector, the method comprising at least one of:

injecting the second fuel having the second fuel composition into the internal combustion engine by the second fuel injector; and preheating the first fuel having the first fuel composition by the heating device and injecting the first fuel by the first fuel injector, wherein the preheating is performed at a central fuel supply line for the first fuel injector, wherein at least one of:

the first and second fuel injectors are controllable independently of each other, and the first fuel injector and the second fuel injector are dimensioned for different fuel flow rates.

13. The method as recited in claim 12, wherein the heating unit is integrated into the first fuel injector.

* * * * *